L. BROOKS.
Boot and Shoe Conformator.
No. 77,166.
Patented April 28, 1868.
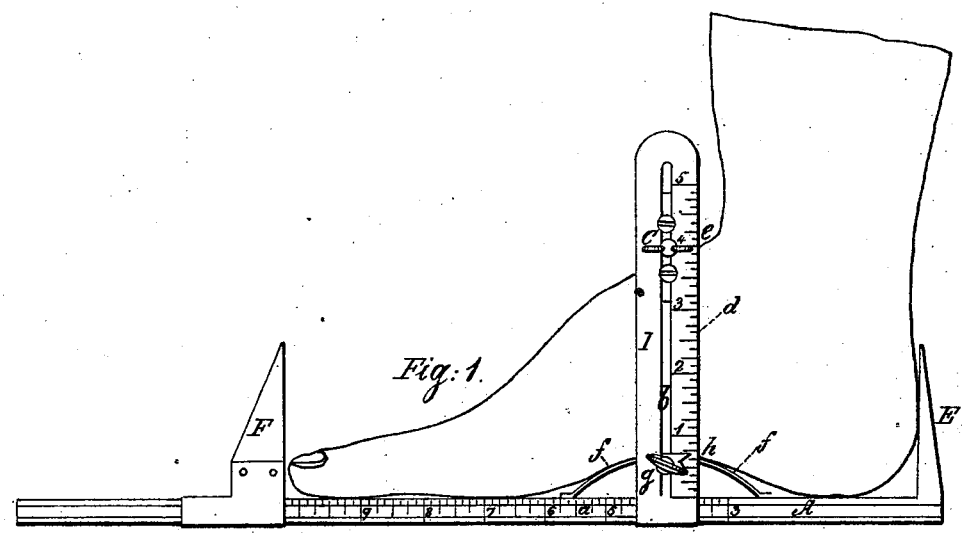
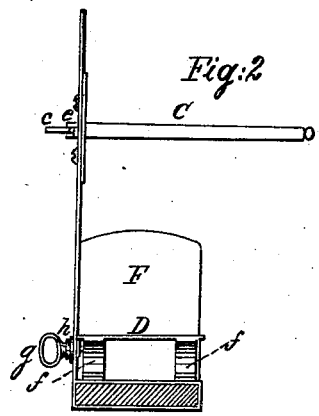

United States Patent Office.

LORIN BROOKS, OF NEW YORK, N. Y.

Letters Patent No. 77,166, dated April 28, 1868.

IMPROVEMENT IN BOOT AND SHOE-CONFORMATEUR.

*The Schedule referred to in these Letters Patent and making part of the same.*

TO ALL WHOM IT MAY CONCERN:

Be it known that I, LORIN BROOKS, of the city and county of New York, have invented a new and improved Instrument for Measuring the Feet, which I denominate the "Boot and Shoe-Conformateur;" and I hereby declare that the following is a full and exact description thereof, reference being had to the accompanying drawings, in which—

Figure 1 is a side elevation, showing the manner of using my conformateur, and

Figure 2 is a transverse section and elevation.

Like letters of reference indicate corresponding parts in both figures.

In fitting a boot or shoe, the ordinary method consists in measuring the length of the foot upon a scale technically termed the "size-stick," and with the tape measure taking the size around certain parts of the foot.

These measurements are not sufficient to enable all feet to be accurately fitted, in consequence of the great difference in the relative proportions of the parts in the feet of different persons, and the difference in the height of the instep and the elevation of the shank or hollow of the foot; and my invention consists in an instrument adapted to taking the perpendicular measurement of the foot, that is, indicating the height of the instep and the elevation of the shank at any given distance from the heel. It consists of a sliding attachment to the ordinary size-stick A, in the form of an upright standard, B, provided with a scale of inches upon its side having a horizontal bar, C, which extends over the top of the foot to indicate the height of the instep at any given distance from the heel, as shown by the scale $a$ of the base-rule or size-stick. This bar passes through a slot, $b$, in the standard, and is provided with a thumb-piece, $c$, by which it is raised or lowered to adjust it to the top of the instep, the elevation being indicated by a pointer, $e$, on the scale $d$. By this means, and by moving the standard along the horizontal scale $a$, a series of measurements may readily be taken of the height of different points upon the instep, giving an accurate record of this contour of the foot, and fully exhibiting any peculiarity in its formation.

The standard B is also provided with a horizontal table, D, for indicating the elevation of the hollow of the foot. To its under side are attached two light curved springs, $ff$, their ends resting on the size-stick, and giving a support to the table, but so slight that it easily yields to the pressure of the foot when placed upon it.

An arm from the table extends through the slot $d$, and connected therewith is the thumb-screw $g$, by the tightening of which the table is fixed in the position in which it has been placed by the pressure of the sole of the foot, and a pointer, $h$, indicates that height on the scale. Any equivalent arrangement of springs may be used for supporting the table D, and keeping it up against the hollow of the foot.

It is important to measure the elevation of the shank as well as that of the instep, in order to enable the last to be shaped to the proper symmetry and proportion of the foot. As a general rule, the height of the shank above the base-line, when added to the instep-measure, gives the required height of the last.

The size-stick may be the same as that in general use, in which E is the fixed, and F the movable upright.

The slotted sliding standard, provided with the adjustable horizontal bar C, and spring-table D, and scale $d$, forms the simple and convenient instrument of measurement, by the use of which the arch and contour of the foot, (both above and below,) may be accurately measured, so that the boot or shoe can be adapted to the exact form, and thereby produce an easy and glove-like fit, and one which admits of the muscles expanding to the extent naturally required, instead of contracting them, and producing lameness and injury, as too often results from the ordinary method of fitting, in which sufficient area is obtained to contain the pedal member, with little regard for the shape which it must assume in performing the functions of walking.

What I claim as my invention, is—

The combination, with the horizontal scale or size-stick A, of the vertical sliding standard B, provided with the scale $d$, adjustable arm C, and spring-table D, arranged and operating substantially as and for the purposes set forth.

In witness whereof, I have hereunto signed my name in the presence of two subscribing witnesses.

LORIN BROOKS.

Witnesses:
WILLIAM KIR RUSS,
G. M. LAWRENCE.